June 16, 1936.  D. C. ROWE ET AL  2,044,368
DIFFERENTIAL SCREW
Filed April 12, 1934  2 Sheets-Sheet 2
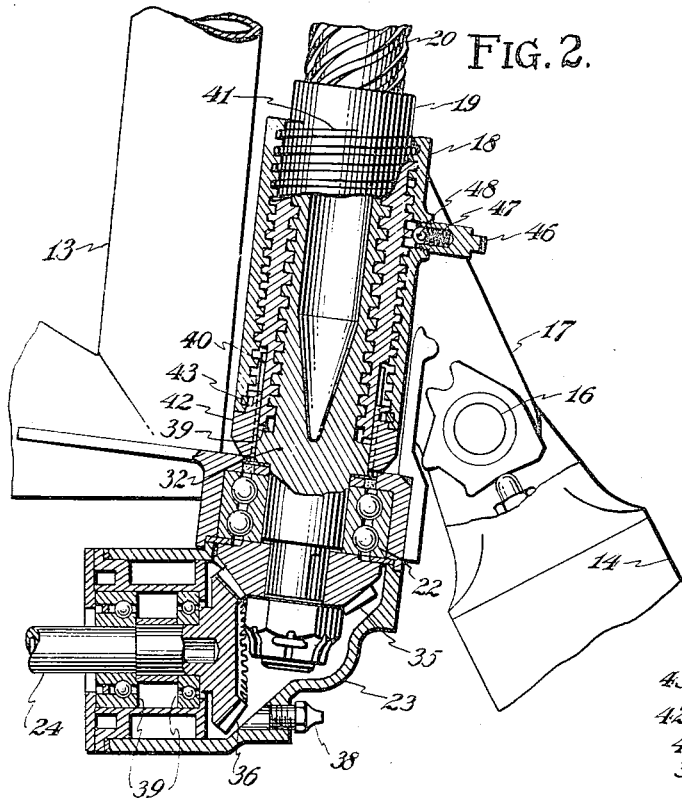
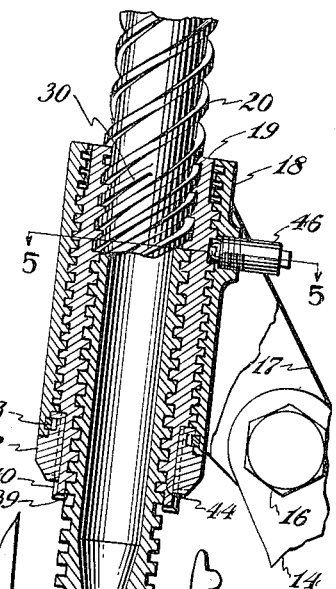
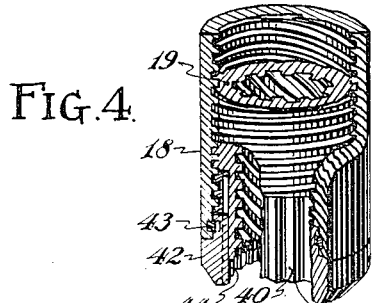
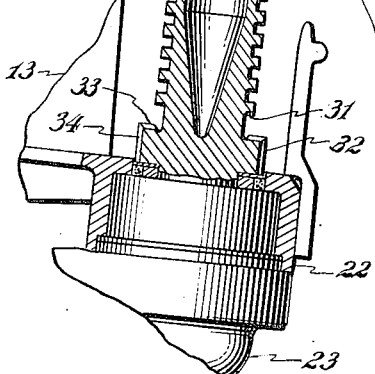
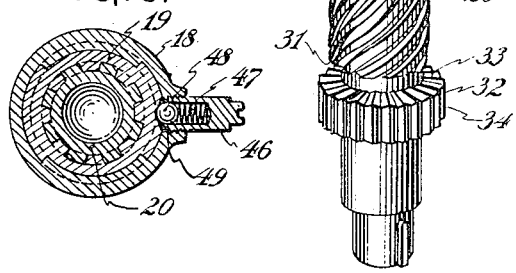
INVENTORS.
DONALD C. ROWE,
WALTER TYDON, and
BY FREDRIC E. FLADER.
ATTORNEYS.

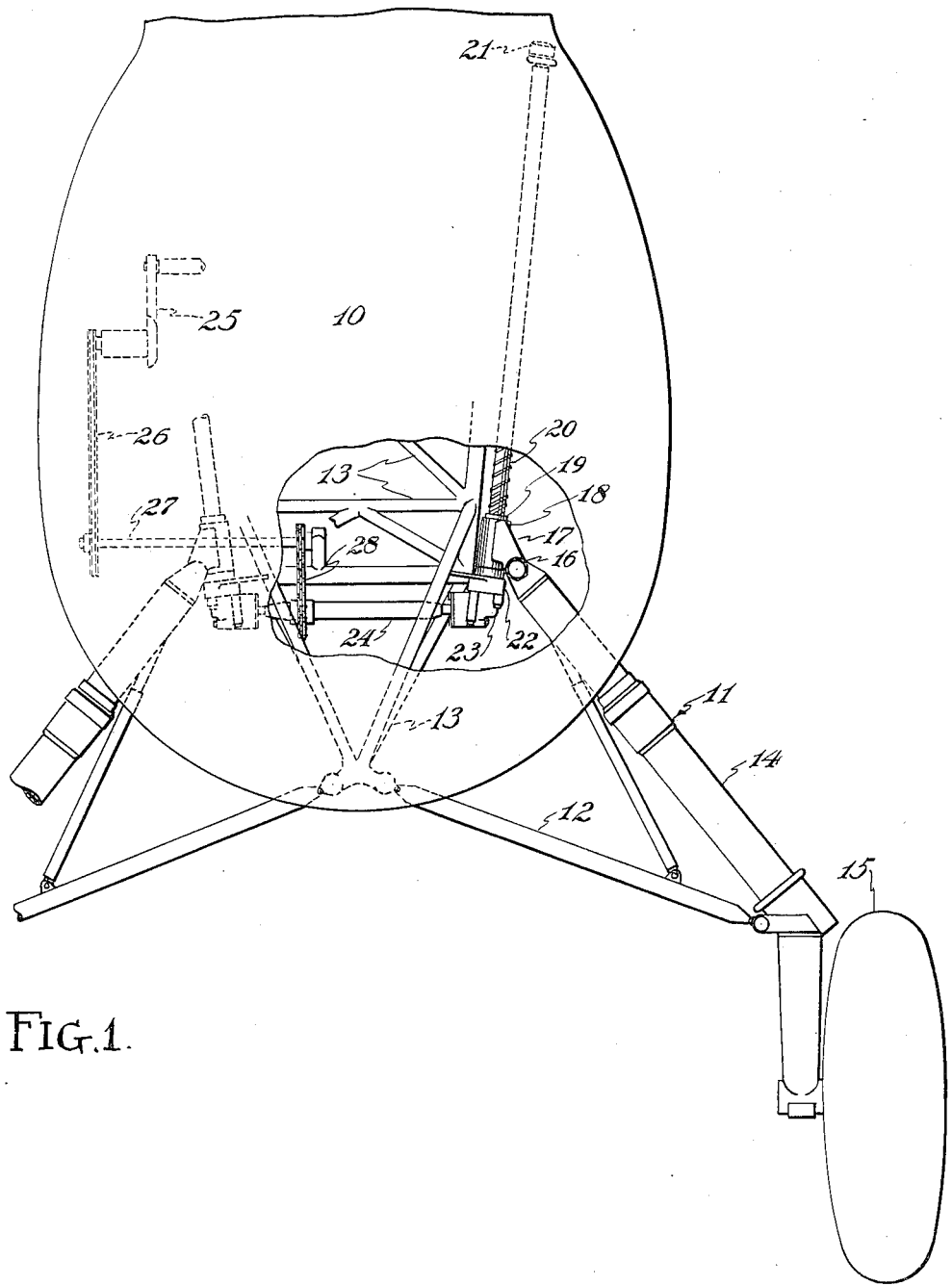

Patented June 16, 1936

2,044,368

UNITED STATES PATENT OFFICE 2,044,368

DIFFERENTIAL SCREW

Donald C. Rowe, Walter Tydon, and Fredric E. Flader, Kenmore, N. Y., assignors to Curtiss Aeroplane & Motor Company, Inc., a corporation of New York Application April 12, 1934, Serial No. 720,188

13 Claims. (Cl. 244—2)

This invention relates to retractable landing gears for aircraft, and is particularly concerned with improvements in operating mechanism therefor.

In the various types of retractable landing gears now in use, the operating mechanisms for these gears include either a lead screw mechanism or a cable mechanism by which certain parts of the landing gear are retracted or extended with respect to the aircraft. This invention relates particularly to those mechanisms in which lead screws are used, and is concerned with a lead screw construction by which the landing gear may be rapidly retracted or extended throughout a major portion of its travel. This is accomplished by means of a very high pitched lead screw, wherein the advance of the lead screw pitch is on the order of more than one screw diameter for one turn of the screw. Such a high pitch screw mechanism, as is well known, has the property of being reversible, that is, if a substantial translational force is exerted on the nut, the nut will be caused to translate along and rotate the lead screw. Such a reversible characteristic is not objectionable so long as there is some means to lock the nut against translation by exterior forces when the landing gear is fully extended. In the past, locking bolts have been provided to prevent reverse rotation of the lead screw or to prevent reverse translation of the nut, but these locking mechanisms have had no part in the retracting mechanism per se, and usually have been operated by a separate control mechanism.

This invention provides a differential screw arrangement whereby the major portion of the retracting and extending movement of the landing gear is accomplished by a high pitch lead screw, but the final extending motion is accomplished by a low pitch screw arrangement which is irreversible and self-locking. The mechanism is so arranged that the low pitch screw automatically comes into action close to the fully extended landing gear position, at which time, the mechanism also locks out of action the high pitch lead screw so that, during the last few turns of the lead screw, the landing gear is irreversibly extended by means of the low pitch screw. Conversely, when retraction is started, the low pitch screw starts the initial retraction, after which, when the landing gear is slightly retracted, the high pitch screw comes into action to effect the balance of the retracting movement.

Specifically, I provide a high pitch lead screw turnable by suitable means available to the pilot, and on which is threaded a sleeve; the exterior surface of the sleeve is threaded with a low pitch screw with which a nut engages, the nut having a suitable fitting for attachment to those portions of the landing gear which are subject to movement for retraction. Mechanism is provided between the lead screw, the sleeve and the nut, whereby, during the major portion of the traverse of the nut and sleeve along the screw, the nut and sleeve are locked together, whereby they are translated by the high pitch screw. At a certain point in the travel of these members along the screw, the sleeve is locked to the lead screw, causing the screw and sleeve to turn with respect to the nut, whereby the low pitch screw effects the final extensive or the initial retractive movement.

Objects of the invention are to provide a retractable landing gear which may be rapidly extended or retracted, but which, when extended, will be automatically locked against retraction due to the imposition of landing shocks on the gear.

A further object is to provide a differential lead screw mechanism for extension and retraction of a landing gear.

Still a further object is to provide a differential screw mechanism wherein one or the other of the differential screw threads are automatically caused to operate in response to a predetermined position of movement of the traveling elements along the screw.

Still another object is to provide an automatically operative clutch mechanism in a differential screw and nut device.

Further objects will be apparent from a reading of the annexed specification and claims and from an examination of the drawings, in which similar numbers indicate similar parts, and in which:

Fig. 1 is a front elevation, partly broken away, of an airplane fuselage having a retractable landing gear, also showing part of the retracting mechanism;

Fig. 2 is a front sectional elevation of a portion of the landing gear operating mechanism, in a position wherein the landing gear is extended;

Fig. 3 is a sectional elevation of the landing gear operating mechanism showing the elements in a partly retracted position of adjustment;

Fig. 4 is a perspective view, partly in section, of certain elements of the operating mechanism; and Fig. 5 is a section on the line 5—5 of Fig. 3.

Fig. 1 diagrammatically shows an airplane fuselage 10 having a landing gear 11 extended therefrom, the landing gear including a strut 12 hinged to the fuselage frame 13. The outer end of the strut 12 is pivoted to a landing gear strut 14 carrying a wheel 15 at its lower end. The upper end of the strut 14 is pivoted as at 16 to a bracket 17 attached rigidly to a nut 18. The nut 18 is screw-threaded, with a low screw pitch, to a sleeve 19, which in turn is threaded on a lead screw 20 with a high screw pitch. Said lead screw is borne at its upper and lower ends in bearings 21 and 22. A gear box 23 is fixed to the casing of the bearing 22 and has extending therefrom a horizontal shaft 24 adapted to be rotated from an operating handle 25 by means of a chain 26, a jack shaft 27 and a second chain 28. Rotation of the shaft 24, through gears in the gear box 23, rotates the lead screw 20 in accordance with the direction of rotation of the handle 25. Now referring to Figs. 2, 3, 4 and 5, the particular mechanism involved in the elements 16 to 23 will be more fully described.

The screw threads on the lead screw 20, as indicated previously, are formed with a very substantial pitch, the pitch being somewhat greater than the diameter of the screw itself. Screw threads of this form will naturally have a plurality of thread elements and, to properly balance the stresses on such screw threads, the upper portion of the lead screw 20 omits alternate thread elements, whereas the lower portion includes all of the thread elements, the alternate threads beginning at such a point as 30. All the thread elements continue downwardly to a point 31 near the bottom of the lead screw. A short cylindrical portion then occurs between the bottom of the screw thread elements and an integral clutch shoulder 32 having serrated upper faces 33 and corresponding serrated cylindrical side surfaces 34, the purpose of which will later be described. Below the shoulder 32, the lead screw passes through the bearing 22 and has attached therebelow a beveled gear 35 within the gear box 23. A coacting beveled gear 36 meshes with the gear 35, the shaft 24 extending horizontally from the gear 36, said shaft being mounted in suitable bearings 37 in the gear box. A pressure grease fitting 38 is inserted in the gear box, whereby lubricant may be fed into the box for lubrication of the gears and bearings. The sleeve 19 is organized with high pitch internal threads for engagement with the high pitch lead screw threads, said sleeve at its lower end having serrations 39 complementary to the serrations 33 on the top of the lead screw shoulder 32. The lower outer portion of the sleeve 19 is also provided with cylindrical side serrations 40 similar in conformation to the side serrations 34 on the shoulder 32. As the lead screw is turned to translate the sleeve downwardly, the serrations 39 meet with the serrations 33 to form a positive stop against further downward travel of the sleeve. When such stopping occurs, the serrations 40 on the sleeve and the serrations 34 on the lead screw will be in vertical alignment. The nut 18, screw-threaded to the outside of the sleeve 19 by low pitch screw threads 41, may rotate and translate with respect to the sleeve between established upper and lower limits. One limit is established by a collar 42 having a running rotational fit with the nut 18, the collar being restrained from translation with respect to the nut by means of an annular key 43 which may be sprung into place upon assembly of the two elements, or may be driven through a suitable opening formed in the nut. The inner bore of the collar 42 is provided with cylindrical serrations 44 which are complementary to the sleeve serrations 40 and the lead screw serrations 34. Thus, the collar 42 always rotates with the sleeve 19, but is translatable with respect thereto upon translation of the nut with respect to the sleeve. Likewise, said collar is always translatable with said nut by virtue of the key 43 but is rotatable with respect to said nut. In operation, assume that the nut and sleeve units are at an intermediate point on the lead screw such as is shown in Fig. 3. The lead screw is rotated to the right, whereby the sleeve is translated downwardly therealong. The nut 18 is caused to rotate with the sleeve 19, due to the fact that the bottom of the sleeve threads abut against the upper portion of the collar 42, whereby the nut may not move along the sleeve and thereby moves downward therewith. Upon contact of the bottom serrations 39 of the sleeve 19 with the upper serrations 33 of the shoulder 32, the sleeve 19 is caused to rotate with the screw. Thereupon, the nut 18 is screwed downwardly with respect to both the sleeve and the screw, carrying with it the collar 42. Said collar, however, slides with respect to the sleeve and screw, but does not rotate with respect thereto by reason of its non-rotational but sliding engagement with the sleeve. As the nut 18 travels downwardly, the collar 42 engages the lead screw serrations 34, and in its lowermost position embraces part of the side serrations 40 and 34 on both the sleeve and the lead screw. This, then, positively locks the sleeve and the lead screw against relative rotation.

By virtue of the irreversible low pitch screw threads between the sleeve 19 and the nut 18, the landing gear elements 14, etc., are positively prevented from inadvertent upward translation under the influence of external forces upon the landing gear.

When it is desired to retract the landing gear, the lead screw 20 is rotated in opposite direction to the left. Initially, until the collar 42 disengages the lead screw serrations 34, the nut is forced to translate upwardly with respect to both the screw and the sleeve, thus starting the landing gear upwardly on the low pitch screw threads. After such disengagement, either the low pitch or the high pitch screw threads are free to act, but the upward movement of the nut 18 with respect to the sleeve 19 on the low pitch threads, is limited by means of a stop 46. This stop, as shown in Fig. 5, comprises a hollow plug threaded into the side wall of the nut 18, a spring 47 within the plug hollow bearing against a ball 48 which, in turn, bears against the screw threads on the sleeve 19. A notch 49 is formed in the external sleeve threads so that, when the nut 18 moves upwardly with respect to said sleeve, the ball 48 will finally engage in said notch 49 to prevent further rotation of the sleeve with respect to the nut. Thereafter, in the retractive landing gear movement, the sleeve and nut are locked against further relative rotation, whereupon, rotation of the screw 20 causes translation therealong of both the nut 18 and the sleeve 19 on the high pitch lead screw threads. Since the lead screw threads are of high pitch, subsequent retraction of the landing gear will be at a relatively high rate of speed, so that the aircraft operator utilizes a minimum length of time in effecting the ultimate retraction of the landing gear.

After the landing gear is fully retracted, both the nut and sleeve will have been withdrawn to the top of the lead screw. Thereafter, opposite rotation of the handle 25 will initiate extension of the landing gear. Such extension occurs on the high pitch screw threads of the lead screw until the position previously described is reached, whereupon the nut 18 is translated with respect to the sleeve 19 to effect final extension. When such action starts, the ball 48 of the stop 46 will be forced out of engagement with the notch 49, since the sleeve 19 will be bottomed on the lead screw shoulder 32.

An advantage accruing from the above described construction is that the operator of the aircraft has only a single landing gear operating crank 25 to turn. He simply turns the crank until it will turn no more, whereupon, according to the direction of rotation of the crank, the landing gear is either fully extended or fully retracted, and when fully extended, is positively locked in such position until retraction is effected by the operator. Still another advantage flowing from the construction is that when the landing gear is almost extended, the operator is afforded a high mechanical advantage for positive bottoming of the landing gear to its fully extended position, by virtue of the low pitch screw threads between the nut 18 and the sleeve 19. The mechanism allows of a single operating means for the landing gear, unencumbered by separately operated locking devices and additional complication. Naturally, if any such separate devices may be obviated, the chance for failure is reduced. By providing a single operating means for the landing gear which accomplishes all of the necessary functions in extension or retraction thereof, the duties of the pilot are simplified, the control mechanisms within the cock-pit are reduced in number, and consequent greater safety of aircraft operation results.

While we have described our invention in detail in its present preferred embodiment, it will be obvious to those skilled in the art, after understanding our invention, that various changes and modifications may be made therein without departing from the spirit or scope thereof. We aim in the appended claims to cover all such modifications and changes.

What is claimed is:

1. In a retractable landing gear operating mechanism, in combination a relatively high pitch lead screw operable to extend and retract said landing gear, relatively low pitch screw means cooperating with said lead screw, and means to initiate operation of said low pitch screw means operated by movement of said landing gear to a nearly extended position; said low pitch screw means serving as an irreversible lock against retraction of said landing gear when external forces are imposed thereon.

2. In an aircraft retractable landing gear operating mechanism, a relatively high pitch turnable lead screw borne in said aircraft for rotation, a sleeve threaded internally for cooperation with said lead screw and having external relatively low pitched screw threads thereon, a nut cooperating with said said external sleeve threads, means connecting said nut with said landing gear, and means responsive to movement of said nut to a certain position of adjustment for locking said sleeve to turn with said lead screw whereby said nut is translated through the functioning of said low pitched threads.

3. In an operating mechanism for an aircraft retractable landing gear, a relatively high pitched lead screw borne for rotation in said aircraft, an internally threaded sleeve engaging said screw and being translatable therealong upon rotation of said screw, said sleeve having relatively low pitched screw threads formed on the outer surface thereof, a nut engaging the low pitched sleeve threads, said nut being normally translatable with said sleeve upon rotation of said screw, means toward an end of said screw for engaging said sleeve upon translation of said sleeve into contact with said means for thereafter causing rotation of said sleeve with said screw whereby said nut is translated along said sleeve by virtue of the low pitched screw threads between said nut and said sleeve.

4. In an aircraft landing gear retracting mechanism, a plurality of concentric screw-threaded members wherein the screw threads between adjacent members are differently pitched from the screw threads of other adjacent members, means for turning one said member, and means operable to lock the other members to each other or one said member to said turnable member in response to the position of said other members along said turnable member.

5. In an aircraft landing gear retracting mechanism, a screw shaft turnable to extend and retract said landing gear, an internally and externally threaded sleeve engaging said screw shaft, a nut engaging the external sleeve threads, said two sets of screw threads being differentially pitched, releasable means to normally rotationally lock said nut and sleeve for joint translation along said screw shaft upon rotation thereof, and means adjacent an end of said screw shaft to lock said sleeve for rotation therewith upon engagement of said sleeve with said means, whereupon said nut, upon further rotation of said shaft, is translated along both said shaft and said sleeve.

6. In an aircraft retractable landing gear operating mechanism, a high pitched screw, a sleeve threaded internally for engagement with said screw and threaded externally at a relatively low screw pitch, a nut engaging the external sleeve threads, a collar translatable with said nut and rotatable with said sleeve, and means carried by said collar for engagement with a portion of said screw upon translation of said sleeve and nut therealong, said means engaging said screw to prevent turning of said sleeve relative to said screw.

7. In an aircraft retractable landing gear operating mechanism, in combination relatively high pitched screw means for effecting the major retractive or extensive landing gear movement, relatively low pitched screw means for effecting the final extensive movement of said landing gear, said relatively low pitched screw means, when said landing gear is fully extended, serving to lock said landing gear against collapsing under externally applied forces, and means operative by movement of said landing gear at a certain point in the extensive movement of said landing gear to lock said high pitched screw means out of action while placing said low pitched screw means in operation.

8. Two phase operating means for retractable landing gears comprising a high speed mechanism for effecting the major portion of the extensive and retractive movement, a low speed irreversible mechanism for effecting the final extension and initial retraction of said landing gear, and means operated by said movement of said landing gear past a certain position in its travel for shifting said high and low speed means into and out of operation.

9. Two phase operating means for retractable landing gears comprising a mechanism for effecting the major portion of the extensive and retractive movement, irreversible means for holding said landing gear in an extended position, and automatic means operated by movement of said landing gear for shifting said irreversible means into and out of operation.

10. Two phase operating means for retractable landing gears comprising a high pitch screw mechanism for effecting the major extending and retracting movement of said landing gear, low pitch irreversible screw mechanism for effecting final extension and locking of said landing gear in an extended position and for effecting initial retraction thereof, and means operated by extensive and retractive movement of said landing gear for shifting said screw mechanisms into and out of operation.

11. In combination, in an aircraft retractable landing gear, relatively low speed irreversible means for effecting final extension and initial retraction of said landing gear, relatively high speed means for effecting final retraction and initial extension of said landing gear, and means operable by movement of said landing gear past a certain position in its travel for shifting said high and low speed means, respectively, into and out of operation.

12. In an aircraft retractable landing gear including a translatable member adapted to move said landing gear between extended and retracted positions, a member movable at relatively constant speed, a high speed driving connection between said members, a low speed driving connection between said members, and means operable by movement of said first member for wholly switching the drive between said members from said low speed connection to said high speed connection during the landing gear retraction, and for wholly switching the drive between said members from said high speed connection to said low speed connection during landing gear extension.

13. In an aircraft retractable landing gear including a movable member adapted to move said landing gear between extended and retracted positions, a second member movable at relatively constant speed, a high speed drive connection between said members having a relatively low mechanical advantage, a low speed, irreversible drive connection between said members having a relatively high mechanical advantage, and means operated by movement of said second member to a predetermined position of adjustment for completely switching from one said driving connection to the other said driving connection.

FREDRIC E. FLADER.
WALTER TYDON.
DONALD C. ROWE.